United States Patent [19]

Baudoux et al.

[11] Patent Number: 4,515,287

[45] Date of Patent: May 7, 1985

[54] PRESSURE ACTIVATED CLOSURE LOCK

[75] Inventors: Richard Baudoux, Nivelles, Belgium; Anthony J. Webb, Wiltshire, England

[73] Assignee: T.D. Williamson, Inc., Tulsa, Okla.

[21] Appl. No.: 619,166

[22] PCT Filed: Sep. 28, 1982

[86] PCT No.: PCT/US82/01341

§ 371 Date: Apr. 27, 1984

§ 102(e) Date: Apr. 27, 1984

[87] PCT Pub. No.: WO84/01354

PCT Pub. Date: Apr. 12, 1984

[51] Int. Cl.[3] .............................................. B65D 45/00
[52] U.S. Cl. .................................................... 220/316
[58] Field of Search ............... 220/316, 367, 303, 327, 220/361, 202, 203, 208, 209

[56]  References Cited

U.S. PATENT DOCUMENTS

| 2,706,999 | 4/1955 | Pickard | 220/316 |
| 3,458,083 | 7/1969 | Erwin, Jr. | 220/316 |
| 4,423,825 | 1/1984 | Baumgarten | 220/316 |
| 4,452,372 | 6/1984 | Robbins | 220/316 |

Primary Examiner—George T. Hall
Attorney, Agent, or Firm—Head, Johnson & Stevenson

[57]  ABSTRACT

A safety lock for a pivoted door (16) closing an opening in a pressure vessel (10) to prevent the door from being opened when pressure in the vessel is above a selected level. A handle (44) is pivotably supported relative to the opening and movable to a locked position in which the door cannot be opened. A pressure lock housing (50) extends from the pressure containment vessel, the housing having a cylindrical opening therein, the axis of which intersects the plane of pivotation of the handle. A piston member (102) is received in the cylindrical opening (98) and has a portion extending externally of the housing. A tubular member (122) carried by the handle is engaged by the piston member when the handle is in the locked position, and pressure within the containment vessel forces the piston member outwardly to thereby prevent the handle from being moved towards the unlocked position. The piston member is automatically retracted when the pressure in the containment vessel is below a safe level.

8 Claims, 5 Drawing Figures

PRESSURE ACTIVATED CLOSURE LOCK

BRIEF SUMMARY OF THE INVENTION

A safety problem frequently encountered in the gas processing and transportation industry, particularly in the operation of pipelines, is that of preventing injury to workmen when a door is opened to a pressure retaining vessel. In many applications it is necessary that ready access be provided to the interior of pressure vessels such as for the insertion or removal of pipeline pigs. For this reason, doors providing such ready access must be quickly opened and closed. Otherwise, too much time is consumed in removing and reinstalling closures in the pressure retaining vessels. A common means of providing access to the interior of a vessel, such as a pipeline, is to mount a hinged door abuttable with a flange with a clamping mechanism to securely clamp the periphery of the door to the flange. By pivotation of a handle the clamping flange can quickly be removed, after which the door freely swings open. A difficulty, however, is that if a workman swings the handle to unlatch the door, and if pressure exists within the pipeline or other vessel to which the flange is affixed, the door will be blown open, causing serious injury.

In order to attempt to prevent accidents of this type, it has been a custom to install pressure indicating instruments in the vicinity of access doors so workmen can visually determine if pressure exists in the vessel before the locking mechanism holding the closure in place is removed. A problem with such precaution, however, is that workmen frequently forget to look at the instrument and assume that there is no pressure within the vessel.

The present invention provides a means of ensuring that a closed door covering an opening in a pressure containment vessel cannot be inadvertently opened if pressure exists within the vessel above a safe, preselected level.

The invention is formed as a part of a door which is hinged to a pressure vessel such as a flange which provides access to the interior of the pressure vessel. The flange and the door, when the door is in closed position, form an abutted peripheral radially extending surface which is held in closed position by semi-circular ring members having a C-shaped cross-sectional configuration. The ring members are pivoted to each other at one side and are secured by a toggle mechanism at the other side. A handle extends from the toggle mechanism. When the handle is in the closed position the toggle mechanism forces the semi-circular ring members together, holding the door in a sealed, locked position. When the handle is swung about its pivotal support it removes force on the toggle mechanism, allowing the semi-circular ring members to be spread apart, removing the clamping action of the door against the flange and permitting the door to be opened.

A pressure lock housing extends from the pressure containment vessel and has a cylindrical opening in it. Reciprocally positioned within the cylindrical opening is a piston member. A spring within the pressure lock housing urges the piston member inwardly. When pressure exists within the interior of the containment vessel, the piston member is forced outwardly against the resiliency of the spring. The handle has a tubular locking member which, when the handle is in closed position, is in axial alignment with the piston. When the handle is closed and pressure exists within the containment vessel, the piston member extends into the tubular locking member, preventing the handle from being moved. Thus, safety and security of the device is achieved to prevent inadvertent injury to a workman attempting to open the door when pressure exists in the containment vessel.

In a preferred arrangement the pressure lock housing has a second cylindrical opening communicating with the interior of a containment vessel in such a manner that the first cylindrical opening extends at right angles to the second cylindrical opening. Positioned within the second cylindrical opening is a second piston, a portion of which extends exteriorly of the housing and has a knob on it. Fluid fills the area between the second piston and the first-mentioned piston. Pressure within the containment vessel first displaces the second piston which in turn causes displacement of the first piston to intercept the handle tubular locking member as previously indicated. The knob attached to the externally extending portion of the second piston provides a visual indication of the existence of pressure within the vessel, augmenting the locking function of the first piston. In addition, an operator wishing to test the amount of pressure within the vessel can physically inwardly depress the knob, depressing the second piston against pressure within the vessel, so that a manual test of the vessel pressure can be made by the workman to reinforce the workman's awareness of the possibility of existence of pressure within the containment vessel.

DESCRIPTION OF THE DRAWINGS

FIG. 1 is a front elevational view of a door closing the end of a tubular pressure vessel, such as to provide access to the interior of a pipeline or the like.

DETAILED DESCRIPTION

Figure 1:
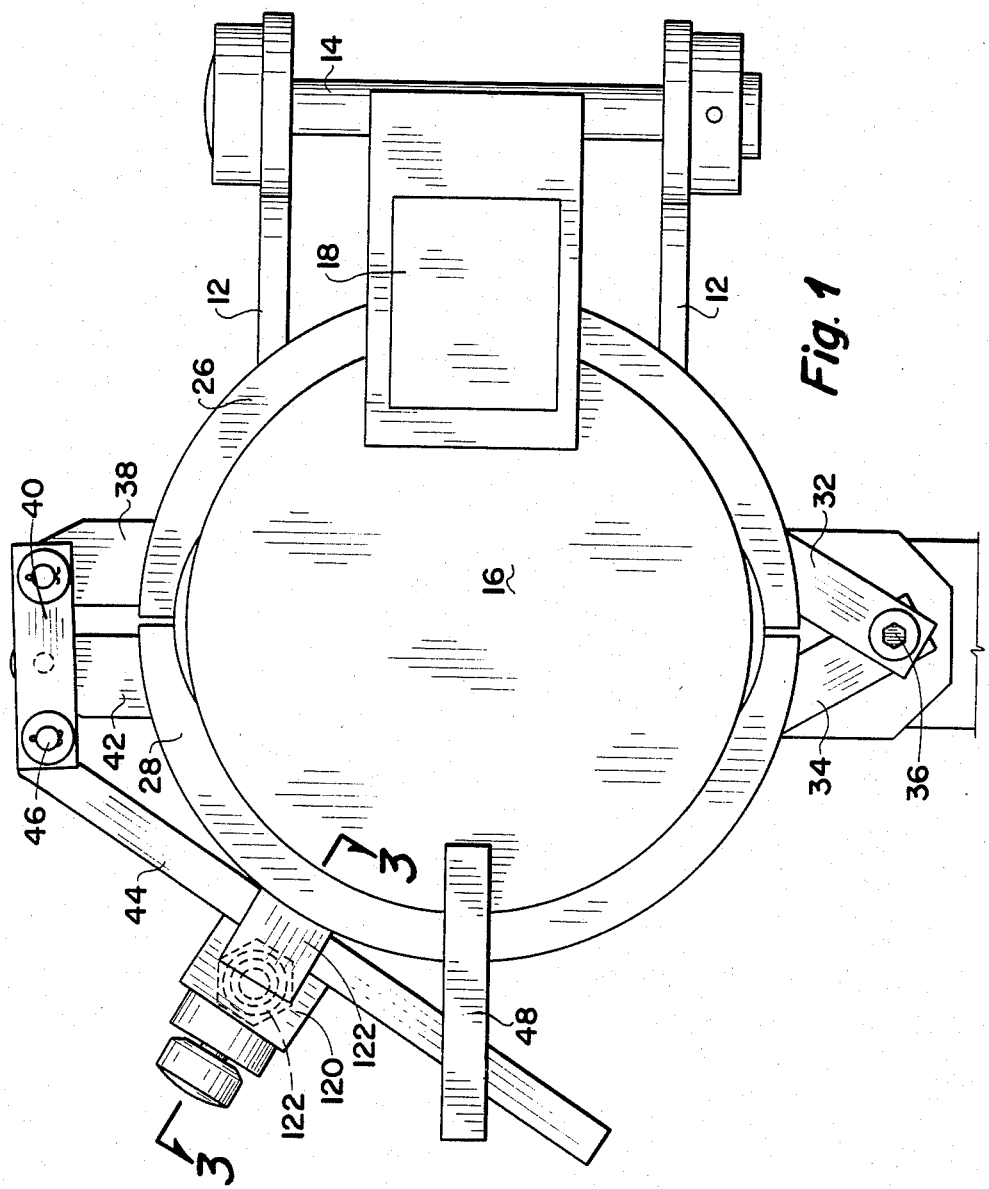
Figure 2:
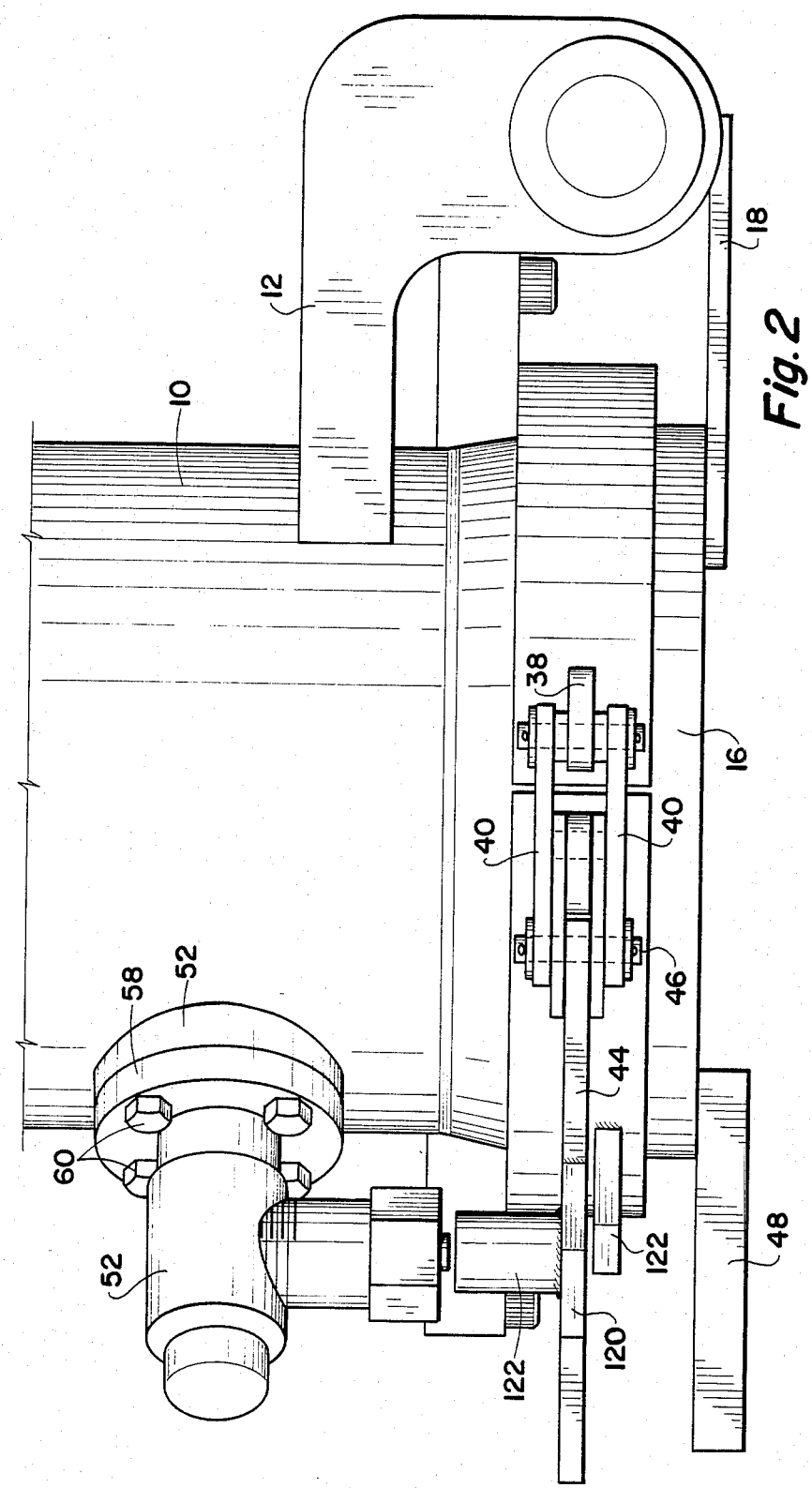
FIG. 2 is a top plan view of a door closing the end of the tubular pressure vessel of FIG. 1.

Referring to the drawings, and first to FIGS. 1 and 2, a closure for a pressure containment vessel is shown with an improved pressure activated lock to prevent the inadvertent opening of the closure when unsafe pressure exists within the vessel. As shown in FIG. 2, the pressure vessel is indicated by the numeral 10, and such vessel may be part of a pipeline system, a short length of piping communicating with a tank, or any other pressure retaining system as employed in industry. The illustrated arrangement of FIGS. 1 and 2 is particularly exemplary of the type of mechanism employed in the pipeline industry to afford access to the interior of a pipeline such as for inserting or retrieving a pipeline pig. Extending from the vessel 10 are brackets 12 supporting a hinge pin 14. A door 16 closes the open end of the pressure vessel 10, the door being supported by a plate 18 to the hinge pin 14. Thus the door 16 can be pivoted to and away from the open end of the vessel about the hinge 14.

Figure 3:
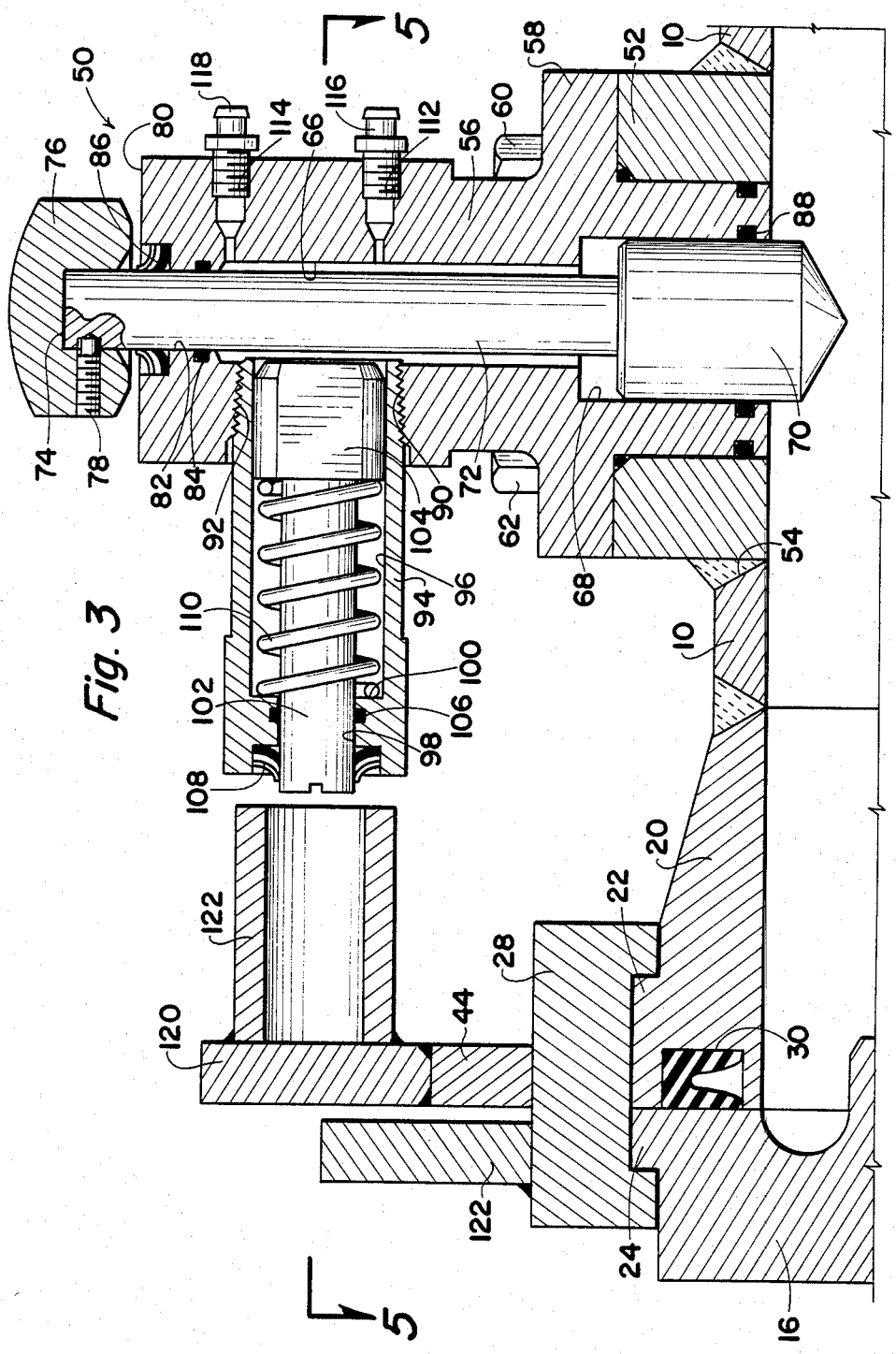
FIG. 3 is a cross-sectional view of the locking mechanism as taken along the line 3—3 of FIG. 1 and showing the mechanism in the condition wherein the pressure in the containment vessel is below a preselected, safe level.

As shown in FIG. 3, the vessel 10 terminates with a flange 20 having a peripheral radially extending lip 22. In like manner, the door 16 has a peripheral circumferential radially extending lip 24. The lip portions 22 and 24 are of equal diameter. When the door 16 is in closed position, as shown in the drawings, the abutted lip portions 22 and 24 provide a radially external circumferential portion which is engaged by semi-cylindrical clamp members 26 and 28. As shown in FIG. 3 the clamp members are C-shaped in cross-sectional configuration so that when in position around the peripheral aubtment of the door 16 and flange 20, the lip portions 22 and 24 are held in engagement with each other and the door 16 is securely locked in position. To provide leakproof engagement of the door 16, a circumferential gasket 30 may be employed as shown in FIG. 3.

The semi-cylindrical clamps are hinged together by means of brackets 32 and 34 connecting to a hinge bolt 36. The upper end of semi-cylindrical clamp 26 receives a bracket 38 connected to a yoke 40. Another bracket 42 extends from the upper end of clamp 28 and is engaged by a toggle action arrangement controlled by means of a handle 44. When the handle 44 is pivoted upwardly about its pivot bolt 46, the toggle arrangement permits the yoke 40 to be separated from bracket 42 allowing the semi-circular clamps 26 and 28 to be spread apart, releasing their hold on the door 16, thus permitting the door 16 to be pivoted open. To aid in the pivotal opening and closing of door 16 a grab bar 48 is provided. The specific arrangement of the toggle mechanism including the brackets 38 and 42, and yoke member 40 is not a part of this invention as the toggle mechanism may be constructed in a variety of ways. Sufficient it is to say that the pivotation of handle 44 serves to allow clamps 26 and 28 to be loosened from engagement with the door and flange, allowing the door to be opened. When the handle 44 is in the closed or downward position as shown in FIGS. 1 and 2, the clamps 26 and 28 are locked in position and the door 16 cannot be removed.

The function of this invention is to prevent handle 44 from being moved from the closed position as shown in FIGS. 1 and 2 when a preselected unsafe level of pressure exists within the pressure containment vessel 10. A pressure lock housing is generally indicated by the numeral 50. As shown in FIGS. 2 and 3, the pressure lock housing is mounted in a short flange 52 secured in an opening 54 formed in the pressure vessel 10. Extending from the flange 52 is housing 56 having an integral flange portion 58. By means of bolts 60, the housing 56 is held in position.

An axial opening 66 is formed in the housing 56. The lower portion of opening 66 adjacent to the lower end of the housing is of enlarged internal diameter at 68 providing a cylinder which reciprocally receives a piston 70. Extending coaxially from the piston 70 is piston rod 72. The outer end 74 of the piston extends externally of housing 56. Affixed to the outer end portion 74 of the piston rod is a knob 76 held in place by means of a set screw 78.

The area of axial opening 66 adjacent the upper end 80 of housing 56 is of reduced internal diameter providing a cylindrical surface 82. A groove receiving an O-ring 84 is formed in the cylindrical surface 82 to seal against piston rod 72. To further prevent the possibility of contamination passing into the interior of the housing opening 66, wiper washers 86 are employed which engage the portion of the piston rod 72 extending externally of the housing 56.

To ensure leakproof engagement of piston 70 with the cylinder wall 68 an O-ring gasket 88 is positioned in a groove formed in the cylinder wall. Thus the area of the internal opening 66 in the housing between O-ring gasket 84 and O-ring gasket 88 is closed and confined. Since piston 70 is of larger diameter than the piston rod 72, upward movement of the piston and piston rod reduces the volume of the area defined by walls 66 and 68.

Formed in the housing 56 is a threaded opening 90. Received in opening 90 is the external threaded end portion 92 of a tubular element 94. The member 94 has internal opening 96 therein which reduces to a smaller diameter opening 98. The difference between the diameters of the opening portion 96 and 98 provides an internal circumferential ledge 100.

Received within the tubular element 94 is a second piston 102 having an integral enlarged diameter portion 104 at the inner end. Enlarged portion 104 functions as a guide rather than as a piston and has flats on opposite sides so that fluid can flow past the guide into the interior 96 of the tubular element. The pressure of fluid within opening 96 functions on piston rod 102 to urge it outwardly. An O-ring 106 contained in a groove in the cylindrical opening 98 forms a seal with the external surface of the piston rod 102. To prevent the possibility of contamination of the piston rod moving within the cylinder 98, wiper rings 108 are employed.

A compression spring 110 is received about the second piston 102 and extends between the ledge 100 and the enlarged diameter guide portion 104 so that the piston is urged inwardly.

Formed in the wall of the housing 96 are two smaller diameter threaded openings 112 and 114, each of which receives a zert fitting 116 and 118. The fittings are used to inject fluid into the openings 66 in the body which also fills the larger diameter portion 68 above piston 70 and the interior of opening 96 in the tubular element 94. By the use of the two fittings, the fluid (preferably such as hydraulic fluid) can be injected into fitting 116 until it flows out through fitting 118, thereby ensuring that the entire interior is completely filled with fluid. The fittings 116 and 118 may be of the type such as used for filling hydraulic brake systems for automobiles wherein the fitting can be loosened to permit the fluid flow therethrough, but when tightened prohibits fluid flow.

Affixed to handle 44 is a plate 120 extending in the plane of pivotation of the handle. Radially extending from the plate 120 is a tubular member 122 of internal diameter sufficiently large to telescopically receive second piston 102.

A guide 122 is secured to the semi-circular clamp 28 to ensure that the handle 44 is maintained in the plane of pivotation about the handle axis formed by bolt 46.

OPERATION

With the door 16 in closed position and with the clamps 26 and 28 secured around it and in engagement with the lip portion 22 of flange 20, the door is in closed position. To secure the clamps 26 and 28 towards each other and securely around the door and flange, the handle 44 must be pivoted downwardly to the closed position as shown in FIG. 1. In this position the tubular element 122 is in direct axial alignment with second piston 102.

Figure 4:
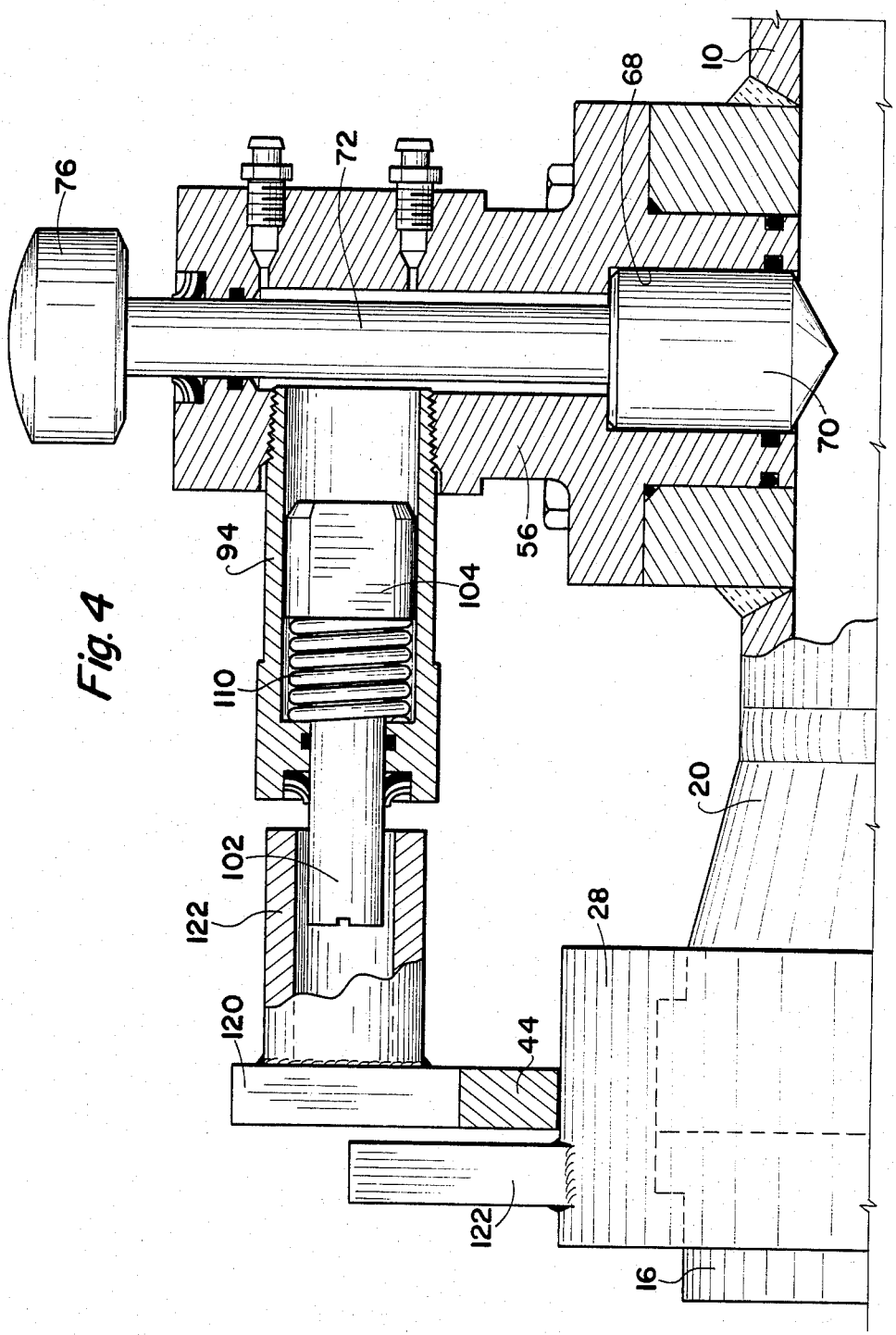
FIG. 4 is a cross-sectional view as in FIG. 3 but showing the condition of the safety lock when the pressure in the vessel is above the preselected safe level.
Figure 5:
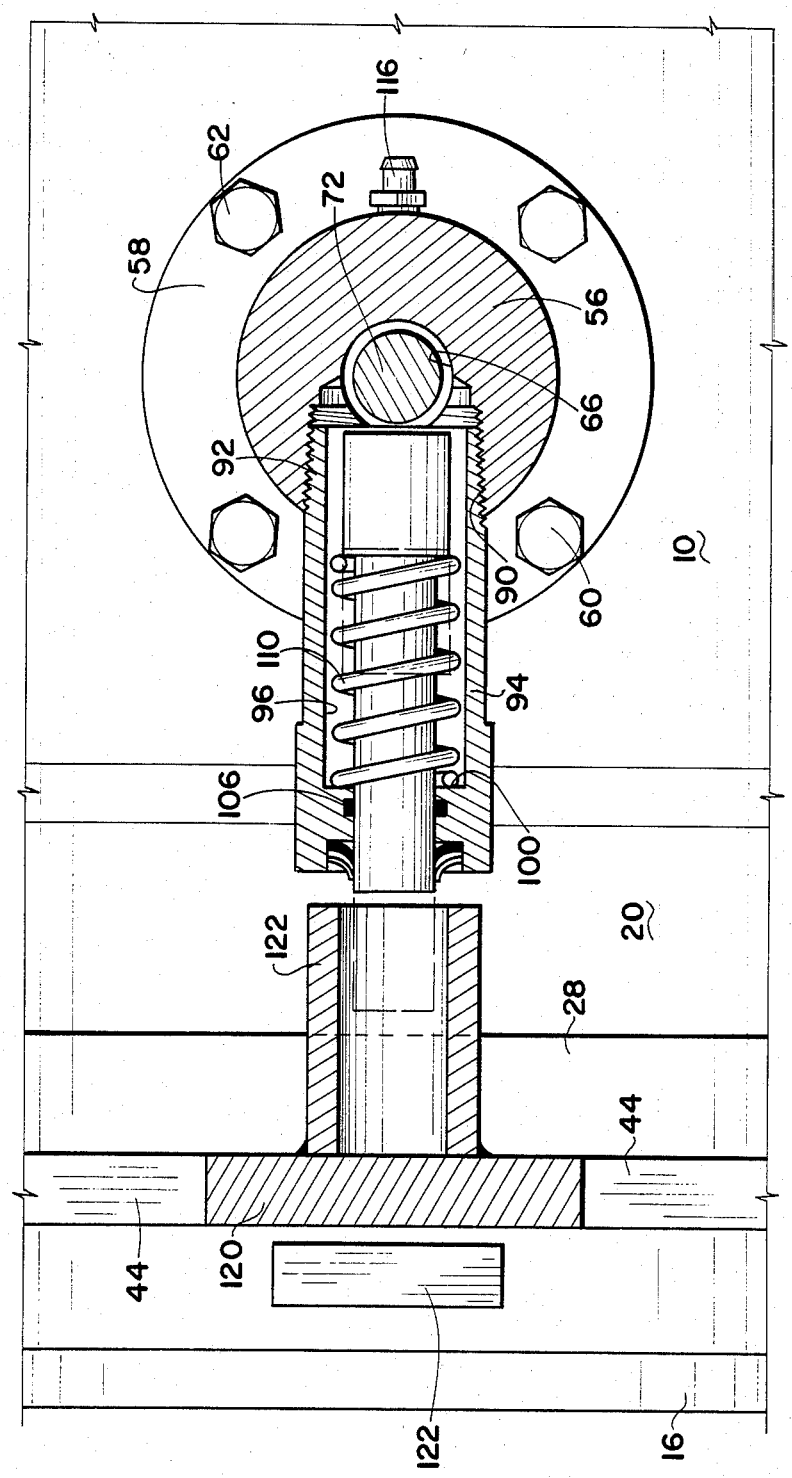
FIG. 5 is a cross-sectional view taken along the line 5—5 of FIG. 3 showing more details of the pressure actuated closure lock.

When pressure exists within the interior of the pressure containment vessel 10, force is applied against piston 70, displacing it upwardly as shown in FIG. 4.

This upward displacement also displaces fluid above the piston in the cylinder 68 and in opening 66, causing the fluid displacement to apply increased hydraulic fluid pressure which can only be compensated for by increase in volume by the outward extension of second piston 102. This extends the second piston 102 into the tubular fitting 122. In such position handle 44 cannot be moved from its closed position, thereby preventing the door 16 from being inadvertently opened.

The displacement of piston 70 and piston rod 72 by the effect of fluid pressure within the housing outwardly displaces the knob 76 giving a visual indication to the operator that pressure exists within the interior of the containment vessel 10. The operator may test the strength of this pressure manually by inwardly depressing the knob 76. In this way if the knob can be relatively easily depressed, the operator knows that only a low pressure exists; but if the inward manual depression of knob 76 is difficult, the operator knows significant pressure exists. In any event, the warning is given to the operator that the pressure within the vessel 10 must be exhausted before the door which provides access to the vessel can be safely opened.

When the pressure within the vessel 10 is reduced below a safe level, spring 110 urges the second piston 102 in the direction towards first piston rod 72, thereby also downwardly deflecting piston 70 and withdrawing piston rod 102 from within the tubular element 122. Thus the handle 44 can then be rotated freely to the open position to allow the door to be removed.

The invention provides a method of preventing a door closing a pressure containment vessel from being inadvertently opened when an unsafe level of pressure exists within the vessel and at the same time provides a method of giving a visual indication of the existence of vessel pressure and a method of manually verifying the level of the pressure within the vessel.

The manual verification can, of course, be in conjunction with a pressure gauge (not shown) connected to the vessel 10. All of such devices help make the operator more cognizant of the potential danger of attempting to open door 16 if an unsafe pressure level exists within the vessel.

While the invention has been described with a certain degree of particularity, it is manifest that many changes may be made in the details of construction and the arrangement of components without departing from the spirit and scope of this disclosure. It is understood that the invention is not limited to the exemplified embodiments set forth herein but is to be limited only by the scope of the attached claim or claims, including the full range of equivalency to which each element thereof is entitled.

What is claimed:

1. Safety apparatus for use to close an opening in a pressure containment vessel comprising:
    a door sealably engageable with an opening in a pressure containment vessel, the door being pivotally supported to move to and away from a closed position;
    a handle pivotally supported relative to the opening and moveable to and away from a locked position in which said door seals the opening;
    a pressure lock housing affixed to and extending from the pressure containment vessel, the housing having a cylindrical opening therein the axis of which intersects the plane of pivotation of said handle, a fluid communication channel connecting the cylindrical opening with the interior of the vessel;
    a piston member reciprocally received in said cylindrical opening and having a portion extending sealably exteriorly of said housing;
    means of biasing said piston inwardly; and
    means carried by said handle engageable by said piston whereby when the handle is in said locked position such means is engaged by said piston member when the pressure within said vessel is above a preselected level and said handle can be moved from the locked position only when the pressure in the vessel is below the preselected level.

2. The safety apparatus according to claim 1 wherein said means carried by said handle is a tubular member which telescopically receives said piston member when said handle is in the locked position and the pressure in said vessel is above the preselected safe opening level.

3. The safety apparatus according to claim 1 wherein said pressure lock housing has a second cylindrical opening therein, one end of such second cylindrical opening communicating with the interior of said pressure containment vessel, the other end of such second cylindrical opening communicating with said first-mentioned cylindrical opening;
    a second piston in said second cylindrical opening, the area within said pressure lock housing between said first and second pistons being filled by a liquid, whereby pressure within said containment vessel above a preselected level displaces said second piston which in turn displaces said first piston to cause the portion of said first piston extending externally of said housing to engage said handle means.

4. The safety apparatus of claim 3 wherein said second piston has a portion extending sealably externally of said pressure lock housing; and
    a knob affixed to said portion of said exteriorly extending portion of said second cylinder providing means of verifying whether or not the internal pressure in said containment vessel is above the preselected safe opening level.

5. A closure for the open end of a tubular pressure vessel comprising:
    a closure door hinged to the exterior wall of the pressure vessel and pivoted to an open position in which the vessel open end is exposed and a closed condition covering the vessel open end;
    a pivoted handle moveable to a closed position when said door is in the closed condition to sealably lock said door to the pressure vessel and moveable to an open position permitting said door to be pivoted away from said pressure vessel open end;
    a tubular pressure lock housing extending from the exterior sidewall of the pressure vessel adjacent to and spaced from the vessel open end, the lock housing communicating with an opening in the vessel sidewall;
    a tubular cylinder member extending radially from and communicating with said pressure lock housing;
    a piston slideably and sealably received in and extending partially externally of said cylinder member;
    means on said handle engaged by said piston when outwardly extended; and
    means of biasing said piston inwardly whereby when said door is in the closed position and said handle is in the locked position the handle is prevented from being moved from the locked position as long as pressure within said vessel is above the preselected level which overcomes said biasing means.

6. A closure for the open end of a pressure vessel according to claim 5 wherein said tubular pressure lock housing provides an internal cylindrical area, and including:

a second piston member reciprocally received in said pressure lock housing cylindrical area, a portion of said second piston extending sealably externally of said lock housing, the area formed within said pressure lock housing and said cylinder member between said first-mentioned and said second piston member being filled with hydraulic fluid whereby the outward displacement of said second piston by pressure in said vessel outwardly displaces said first-mentioned piston by hydraulic action.

7. The safety apparatus according to claim 5 wherein said means carried by said handle is a tubular member which telescopically receives said piston member when said handle is in the locked position and the pressure in said vessel is above the preselected safe opening level.

8. A closure for the open end of a pressure vessel according to claim 5 including:

a hand engageable knob means affixed to said externally extending portion of said second piston.

* * * * *